United States Patent
Tang

(10) Patent No.: US 11,323,996 B2
(45) Date of Patent: May 3, 2022

(54) DATA TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/000,169

(22) Filed: Aug. 21, 2020

(65) Prior Publication Data

US 2020/0389877 A1 Dec. 10, 2020

Related U.S. Application Data

(63) Continuation of application No. 16/694,878, filed on Nov. 25, 2019, now Pat. No. 10,834,720, which is a
(Continued)

(51) Int. Cl.
*H04W 72/04* (2009.01)
*H04W 76/15* (2018.01)
(Continued)

(52) U.S. Cl.
CPC ..... *H04W 72/042* (2013.01); *H04W 28/0205* (2013.01); *H04W 76/15* (2018.02); *H04W 80/02* (2013.01)

(58) Field of Classification Search
CPC .............. H04W 72/042; H04W 76/15; H04W 28/0205; H04W 80/02; H04L 29/06088;
(Continued)

(56) References Cited

U.S. PATENT DOCUMENTS 8,605,674 B2 12/2013 Park
10,834,720 B2 * 11/2020 Tang ................ H04W 28/0205
(Continued)

FOREIGN PATENT DOCUMENTS

CN 1716830 A 1/2006
CN 101166344 A 4/2008
(Continued)

OTHER PUBLICATIONS

Second Office Action of the Chilean application No. 201903612, dated Jun. 18, 2021.
(Continued)

*Primary Examiner* — Mewale A Ambaye
(74) *Attorney, Agent, or Firm* — Ladas & Parry, LLP

(57) ABSTRACT

Provided in the embodiments of the disclosure are methods for transmitting data, a terminal device and a network device. One method includes: a terminal device receives semi-static configuration information sent by a network device, the semi-static configuration information being used for indicating an initial state of a duplicated-data transmission function of a Packet Data Convergence Protocol (PDCP) entity corresponding to a Radio Bearer (RB), and the initial state including an activated state or a deactivated state; and the terminal device establishes a first RB according to the semi-static configuration information. The methods, the terminal device and the network device provided by the embodiments of the disclosure help to improve the reliability of data transmission.

21 Claims, 4 Drawing Sheets

Related U.S. Application Data continuation of application No. PCT/CN2017/088659, filed on Jun. 16, 2017.

(51) Int. Cl.
  *H04W 28/02* (2009.01)
  *H04W 80/02* (2009.01)
(58) Field of Classification Search
  CPC .................. H04L 1/1812; H04L 5/001; H04L 2001/0096; H04L 1/1887; H04L 1/1819
  See application file for complete search history.

(56) References Cited

U.S. PATENT DOCUMENTS

| | | | |
|---|---|---|---|
| 2008/0209146 | A1 | 8/2008 | Imazu |
| 2010/0165937 | A1 | 7/2010 | Yi |
| 2010/0278341 | A1 | 11/2010 | Kubota |
| 2012/0057560 | A1* | 3/2012 | Park .................. H04L 1/189 370/329 |
| 2015/0071250 | A1 | 3/2015 | Dai et al. |
| 2015/0341812 | A1 | 11/2015 | Dion et al. |
| 2017/0055191 | A1 | 2/2017 | Shinada et al. |
| 2018/0049224 | A1* | 2/2018 | Dinan ............... H04W 72/0413 |
| 2018/0309660 | A1* | 10/2018 | Loehr ..................... H04L 45/24 |
| 2018/0368132 | A1* | 12/2018 | Babaei ................ H04W 80/02 |
| 2019/0222474 | A1 | 7/2019 | Wittberg et al. |
| 2020/0007281 | A1 | 1/2020 | Kilinc et al. |
| 2020/0029355 | A1* | 1/2020 | Liu ......................... H04L 5/001 |
| 2020/0052826 | A1 | 2/2020 | Han et al. |
| 2020/0119864 | A1 | 4/2020 | Xu et al. |
| 2020/0154467 | A1* | 5/2020 | Gong .................... H04W 24/08 |

FOREIGN PATENT DOCUMENTS

| | | | |
|---|---|---|---|
| CN | 103782569 | A | 5/2014 |
| CN | 104113875 | A | 10/2014 |
| CN | 106162730 | A | 11/2016 |
| RU | 2443078 | C2 | 2/2012 |
| RU | 2485703 | C2 | 6/2013 |
| WO | 2013155846 | A1 | 10/2013 |

OTHER PUBLICATIONS

First Office Action of the Taiwanese application No. 107120590, dated Jun. 28, 2021.
Ericsson: "PDCP Uplink transmit operation", 3GPP DRAFT; R2-1704681, May 14, 2017, XP051275226.
Ericsson: "PDCP data volume reporting in duplication (BSR)", 3GPP DRAFT; R2-1704370, May 6, 2017, XP051264384.
Oral Examination of the European application No. 17913653.6, dated Aug. 12, 2021.
ZTE, "Consideration on the activation/deactivation of data duplication for CA [online]", 3GPP TSG RAN WG2 #98 R2-1704660, May 19, 2017.
Second Office Action of the Japanese application No. 2019-569447, dated Sep. 7, 2021.
Notice of Allowance of the Chinese application No. 201911329391. 0, dated Jan. 13, 2021.
First Office Action of the European application No. 17913653.6, dated Jan. 22, 2021.
Notice of Allowance of the Russian application No. 2020100611, dated Nov. 12, 2020.
CATT "Configuration and activation/deactivation of duplication" 3GPP TSG-RAN WG2 Meeting #98 R2-1704247 Hangzhou, China, May 15-19, 2017.
First Office Action of the Chilean application No. 201903612, dated Feb. 16, 2021.
First Office Action of the Canadian application No. 3066821, dated Feb. 22, 2021.
First Office Action of the Indian application No. 201917052055, dated Mar. 31, 2021.
First Office Action of the Japanese application No. 2019-569447, dated Apr. 20, 2021.
Notice of Allowance of the U.S. Appl. No. 16/694,878, dated Aug. 27, 2020.
First Office Action of the Chinese application No. 201911329391.0, dated Nov. 3, 2020, with search report.
International Search Report in the international application No. PCT/CN2017/088659, dated Feb. 28, 2018.
Written Opinion of the International Search Authority in the international application No. PCT/CN2017/088659, dated Feb. 28, 2018.
Interdigital Inc: "Control of PDCP duplication", BGPP DRAFT; R2-1704916 (R15 NR WI A1022 PDCP Duplication), 3rd Generation Partnership Project (3GPP), Mobile Competence Centre: 650, Route Des Lucioles: F-06921 Sophia-Antipolis Cedex France vol. RAN WG2, No. Hangzhou, China; May 15, 2017-May 19, 2017 May 14, 2017 (May 14, 2017), XP051275431, Retrieved from the Internet: URL: http://www.3gpp.org/ftp/Meetings3GPP SYNC/RAN2/Docs/ [retrieved on May 14, 2017], entire document.
Ericsson: "Dynamic reconfiguration of split bearer or duplication", 3GPP DRAFT: R2-1704374-PDCP Dynamic Reconfiguration, 3rd Generation Partnership Project (3GPP), Mobile Competence Centre; 650, Route Des Lucioles; F-06921 Sophia-Antipolis Cedex; France vol. RAN WG2, No. Hangzhou; 201705152017051914 May 2017 (May 14, 2017), XP051274948, Retrieved from the Internet: URL: http://ww.3gpp. org/ftp/Meetings_3GPP SYNC/RAN2/Docs/ [ retrieved on May 14, 2017], entire document.
Oppo: "MAC operation on the duplicated data from PDCP layer", 3GPP DRAFT; R2-1702546 MAC Operations Onthe Duplicated Data From PDCP Layer, 3rd Generation Partnership Project (3GPP) Mobile Competence Centre ; 650, Route Des Lucioles : F-06921 Sophia-Antipolis C vol. RAN WG2, No. Spokane, USA; 20170403201704073 Apr. 2017 (Apr. 3, 2017), XP051244562, Retrieved from the Internet: URL: http://www.3gpp. org/ftp/ Meetings 3GPP SYNC/RAN2/Docs/ [ retrieved on Apr. 3, 2017], entire document.
Qualcomm Incorporated: "Discussion on PDCP duplication", 3GPP DRAFT; R2-1705056, 3rd Generation Partnership Project (3GPP), Mobilecompetence Centre; 650, Route Des Lucioles: F-06921 Sophia-Antipolis Cedex; France vol. RAN WG2, No. Hangzhou, China; May 15, 2017-May 19, 2017 May 14, 2017 (May 14, 2017), XP051275538, Retrieved from the Internet: URL: http://www.3gpp. org/ftp/Meetings 3GPP SYNC/RAN2/Docs/ [ retrieved on May 14, 2017], entire document.
Supplementary European Search Report in the European application No. 17913653.6, dated May 8, 2020.
Huawei, HiSilicon; "Dynamic activation/deactivation of packet duplication"; 3GPP TSG-RAN2 #98 R2-1704835 Hangzhou, China, May 15-19, 2017, entire document.
Huawei, "Email discussion summary on control of UL PDCP duplication"; 3GPP TSG-RAN2#98 R2-1704834 Hangzhou, China, May 15-19, 2017, entire document.
First Office Action of the Russian application No. 2020100611, dated Jul. 3, 2020.
Non-Final Office Action of the U.S. Appl. No. 16/694,878, dated Feb. 3, 2020.
Notice of Allowance of the U.S. Appl. No. 16/694,878, dated May 20, 2020.
International Preliminary Report on Patentability issued in the international application No. PCT/CN2017/088659, dated Dec. 17, 2019.
First Office Action of the Korean application No. 10-2019-7036885, dated Oct. 19, 2021.
Second Office Action of the Canadian application No. 3066821, dated Nov. 19, 2021.
Notice of Re-Examination of the Taiwanese application No. 107120590, dated Nov. 25, 2021.
Decision of Refusal of the European application No. 17913653.6, dated Feb. 2, 2022.

* cited by examiner

DATA TRANSMISSION METHOD, TERMINAL DEVICE, AND NETWORK DEVICE

CROSS REFERENCE TO RELATED APPLICATIONS

This application is a continuation of U.S. patent application Ser. No. 16/694,878 filed on Nov. 25, 2019, which is a continuation of PCT Application No. PCT/CN2017/088659 filed on Jun. 16, 2017 and titled with "DATA TRANSMISSION METHOD, TERMINAL DEVICE, AND NETWORK DEVICE", which are hereby incorporated by reference in their entireties.

BACKGROUND

In a New Radio (NR) system, the demand on the reliability of data transmission is higher, and thus how to improve the reliability of data transmission is a problem that has been researched all the time.

SUMMARY

The embodiments of the disclosure relate to the field of communication, and in particular to methods, terminal devices and network devices for transmitting data.

In view of this, the embodiments of the disclosure provide methods for transmitting data, a terminal device and a network device to improve the reliability of data transmission.

A first aspect provides a method for transmitting data, which includes: a terminal device receives radio resource control (RRC) signaling from a network device, the RRC signaling being used for indicating an initial state of a duplicated-data transmission function of at least one Packet Data Convergence Protocol (PDCP) entity corresponding to at least one Radio Bearer (RB), and the initial state including an activated state or a deactivated state; the terminal device establishes a first RB according to the RRC signaling.

The terminal device may receive switch information from the network device, the switch information being used for indicating to switch a state of duplicated-data transmission of a PDCP entity corresponding to the first RB. The terminal device may send data to the network device according to the switch information. When the initial state is the activated state, the operation that the terminal device sends the data to the network device according to the switch information may include that the terminal device receives indication information which is used for indicating a first Radio Link Control (RLC) entity and the terminal device sends non-duplicated data to the network device via the first RLC entity, the first RLC entity being among at least two RLC entities corresponding to the PDCP entity corresponding to the first RB.

A second aspect provides a method for transmitting data, which includes: a network device sends RRC signaling to a terminal device, the RRC signaling being used for indicating an initial state of a duplicated-data transmission function of at least one PDCP entity corresponding to at least one RB, and the initial state including an activated state or a deactivated state.

The network device may send switch information to the terminal device, the switch information being used for indicating to switch a state of duplicated-data transmission of a PDCP entity corresponding to a first RB. When the initial state is the activated state, the method may further include that the network device sends indication information to the terminal device, the indication information being used for indicating a first RLC entity; and the network device receives non-duplicated data from the terminal device via the first RLC entity, the first RLC entity being among at least two RLC entities corresponding to the PDCP entity corresponding to the first RB.

A third aspect provides a terminal device, which includes an input interface, an output interface and a processor. The input interface may be configured to receive RRC signaling sent by a network device, the RRC signaling being used for indicating an initial state of a duplicated-data transmission function of at least one PDCP entity corresponding to at least one RB, and the initial state comprising an activated state or a deactivated state. The processor may be configured to establish a first RB according to the RRC signaling.

The input interface may be further configured to receive switch information sent by the network device, the switch information being used for indicating to switch a state of duplicated-data transmission of a PDCP entity corresponding to the first RB. The output interface may be configured to send data to the network device according to the switch information. When the initial state is the activated state, the input interface may be further configured to receive indication information, the indication information being used for indicating a RLC entity, and the output interface may be further configured to send non-duplicated data to the network device via the first RLC entity, wherein the first RLC entity is among at least two RLC entities corresponding to the PDCP entity corresponding to the first RB.

A fourth aspect provides a network device, which includes a processor and an output interface. The processor may be configured to determine RRC signaling, the RRC signaling being used for indicating an initial state of a duplicated-data transmission function of at least one PDCP entity corresponding to at least one RB, and the initial state including an activated state or a deactivated state. The output interface may be configured to send the RRC signaling to a terminal device.

The output interface may be configured to send switch information to the terminal device, the switch information being used for indicating to switch a state of duplicated-data transmission of a PDCP entity corresponding to a first RB. When the initial state is the activated state, the output interface may be further configured to send indication information to the terminal device, the indication information being used for indicating a first RLC entity, and the processor may be further configured to control an input interface to receive non-duplicated data from the terminal device via the first RLC entity, wherein the first RLC entity is among at least two RLC entities corresponding to the PDCP entity corresponding to the first RB.

These aspects or other aspects of the disclosure will become clearer and easier to understand through the following descriptions about the embodiments.

DETAILED DESCRIPTION

Figure 1:
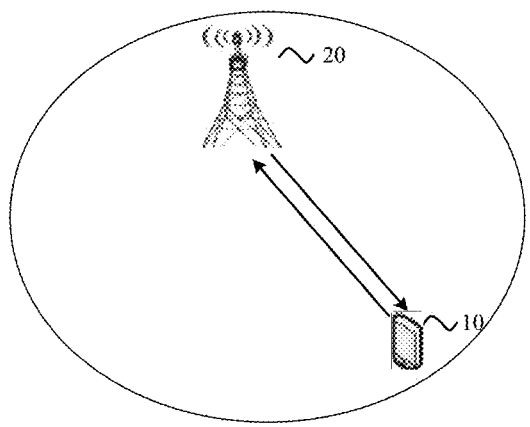
FIG. 1 illustrates a schematic diagram of an application scenario according to an embodiment of the disclosure.

The technical solutions in the embodiments of the disclosure will be clearly and completely described below in combination with the drawings in the embodiments of the disclosure.

It is to be understood that the technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system.

Particularly, the technical solutions of the embodiments of the disclosure may be applied to various non-orthogonal multiple access technology-based communication systems, for example, a Sparse Code Multiple Access (SCMA) system and a Low Density Signature (LDS) system, and of course, the SCMA system and the LDS system may also have other names in the field of communication. Furthermore, the technical solutions of the embodiments of the disclosure may be applied to multi-carrier transmission systems adopting non-orthogonal multiple access technologies, for example, Orthogonal Frequency Division Multiplexing (OFDM), Filter Bank Multi-Carrier (FBMC), Generalized Frequency Division Multiplexing (GFDM) and Filtered-OFDM (F-OFDM) systems adopting the non-orthogonal multiple access technologies.

In the embodiments of the disclosure, a terminal device may refer to User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device or other processing devices connectable to a wireless modem, a vehicle-mounted device, a wearable device, UE in a future 5G network, UE in a future evolved Public Land Mobile Network (PLMN) or the like. There are no limits made in the embodiments of the disclosure.

In the embodiments of the disclosure, a network device may be a device configured to communicate with a terminal device. The network device may be a Base Transceiver Station (BTS) in GSM or CDMA, may also be a NodeB (NB) in a WCDMA system, may also be an Evolutional Node B (eNB or eNodeB) in an LTE system, or may be a wireless controller in a Cloud Radio Access Network (CRAN) scenario. Or the network device may be a relay station, an access point, a vehicle-mounted device, a wearable device, a network device in a future 5G network, a network device in a future evolved PLMN or the like. There are no limits made in the embodiments of the disclosure.

FIG. 1 is a schematic diagram of an application scenario according to an embodiment of the disclosure. A communication system in FIG. 1 may include a terminal device 10 and a network device 20. The network device 20 is configured to provide a communication service for the terminal device 10 for access to a core network. The terminal device 10 accesses the network by searching for a synchronous signal, broadcast signal and the like sent by the network device 20, thereby communicating with the network. Arrows shown in FIG. 1 may represent uplink/downlink transmission implemented through a cellular link between the terminal device 10 and the network device 20.

At present, in NR researches, it has been agreed that a PDCP may support a data duplication function, i.e., a data duplication function of the PDCP is used. As a result, the duplicated data corresponds to two or more logical channels, and it is finally ensured that the duplicated multiple same PDCP PDUs can be transmitted on different physical-layer aggregated carriers, thus achieving a frequency diversity gain to improve the reliability of the data transmission.

Figure 2:
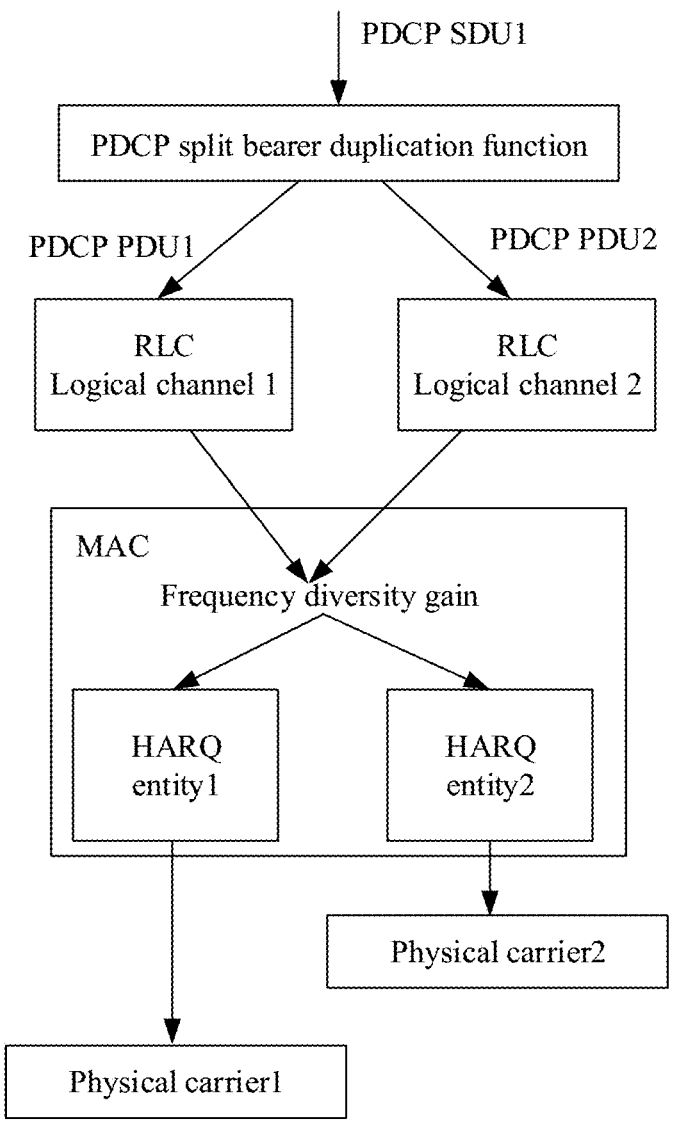
FIG. 2 illustrates an architecture diagram of a protocol of duplicated-data transmission in a carrier aggregation scenario.

For the ease of understanding, a simple instruction on how to schedule duplicated data to different physical carriers will be given in combination with FIG. 2. As shown in FIG. 2, the PDCP layer has a split bearer duplication function, and the data process of the PDCP SDU1 is duplicated and encapsulated into a PDCP PDU1 and a PDCP PDU2; and the PDCP PDU1 and the PDCP PDU2 have the same content, i.e., the data payload and header of the bearer are the same. The PDCP PDU1 and the PDCP PDU2 are respectively mapped to different RLC entities, and the PDCP PDU1 and the PDCP PDU2 are placed into different logical channels (logical channel 1 and logical channel 2) by the RLC entities. In response to knowing which logical channels transmit the duplicated data of a same PDCP PDU, the MAC transmits these duplicated data on different carriers via different Hybrid Automatic Repeat Request (HARQ) entities, e.g., the MAC transmits the duplicated data borne in the logical channel 1 on a physical carrier 1 via an HARQ entity 1, and transmits the duplicated data borne in the logical channel 2 on a physical carrier 2 via an HARQ entity 2.

In the current researches, there hasn't been a clear solution on how to configure a duplicated-data transmission function of a PDCP entity and how to establish a corresponding bearer.

It is understood by a person skilled in the art that an uplink PDCP data duplication function is configured based on an RB, i.e., different RBs may configure PDCP duplicated-data transmission or may also not configure the PDCP duplicated-data transmission.

The RB is a generic term for a series of protocol entities and configurations allocated to UE, including a PDCP protocol entity, an RLC protocol entity, and a series of resources allocated by an MAC and a PHY. The RB includes an SRB and a DRB. The SRB is a channel for actually transmitting a signaling message of a system, and the DRB is a channel for actually transmitting user data.

Figure 3:
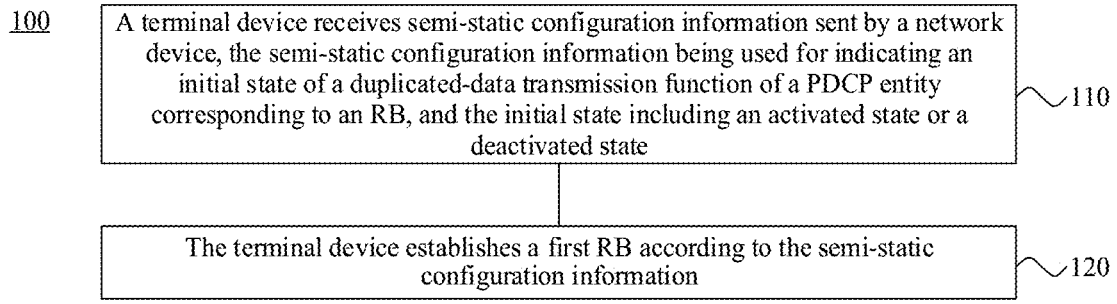
FIG. 3 illustrates a schematic block diagram of a method for transmitting data according to an embodiment of the disclosure.

FIG. 3 illustrates a schematic block diagram of a method 100 for transmitting data according to an embodiment of the disclosure. As shown in FIG. 3, the method 100 includes the following operations.

At S110, a terminal device receives semi-static configuration information sent by a network device, the semi-static configuration information being used for indicating an initial state of a duplicated-data transmission function of a PDCP entity corresponding to an RB, and the initial state including an activated state or a deactivated state.

At S120, the terminal device establishes a first RB according to the semi-static configuration information.

Specifically, the network device may configure for the terminal device an initial state of a duplicated-data transmission function of a PDCP entity corresponding to a to-be-established RB. For example, the network device may determine the initial state according to whether a current service has a reliability demand on the data transmission or not. Under a condition in which the reliability demand on the data transmission is high, the network device may notify the terminal device of configuring the initial state to be the activated state, i.e., an RB to be established by the terminal device finally may transmit duplicated data, e.g., a PDCP entity of an established RB is associated with multiple RLC entities. Under a condition in which the reliability demand on the data transmission is not high, the network device may also notify the terminal device of configuring the initial state to be the deactivated state, i.e., an RB to be established by the terminal device finally may transmit non-duplicated data, e.g., a PDCP entity of an established RB may be associated with multiple RLC entities. In this case, the terminal device may determine independently to use at least one RLC entity among the multiple RLC entities to transmit the non-duplicated data, and the network device may also instruct the terminal device to transmit the non-duplicated data via at least one RLC entity among the multiple RLC entities. Additionally, the terminal device may also associate a PDCP entity of the to-be-established RB with one RLC entity, and the terminal device may directly use this RLC entity to transmit the non-duplicated data.

Therefore, by adopting the method for transmitting data in this embodiment of the disclosure, a bearer established based on the configuration of the network device helps to improve the reliability of the data transmission.

It is to be understood that the semi-static configuration information may be understood as radio resource control (RRC) signaling. The network device establishes a corresponding bearer via the semi-static configuration information, which indicates that a state of a duplicated-data transmission function of a PDCP entity corresponding to an RB within a certain time is fixed. If the network device does not give a further indication to the terminal device within a certain time, the terminal device may transmit data in the initial state of the duplicated-data transmission function of the PDCP entity corresponding to the RB configured by the network device to the terminal device. That is, if the state of a duplicated-data transmission function of a PDCP entity corresponding to an RB configured by the network device to the terminal device is the deactivated state, the terminal device may transmit non-duplicated data via the RB all the time within a certain time, or if the state of a duplicated-data transmission function of a PDCP entity corresponding to an RB configured by the network device to the terminal device is the activated state, the terminal device may transmit the duplicated data via the RB all the time within a certain time.

It is to be further understood that when the duplicated data are transmitted, the PDCP corresponding to an RB may correspond to multiple RLC entities, which is also mentioned above. For the ease of description, a part of the following embodiments take corresponding two RLC entities as an example, and the embodiments of the disclosure are not limited to this.

In order to further improve the flexibility of data transmission, in this embodiment of the disclosure, the method may further include: the terminal device receives switch information sent by the network device, the switch information being used for instructing to switch a state of duplicated-data transmission of a PDCP entity corresponding to the first RB; and the terminal device sends data to the network device according to the switch information.

Specifically, the network device may dynamically adjust a state of duplicated-data transmission of a PDCP entity corresponding to an RB after a certain time according to conditions such as the present channel quality. For example, it is found by the network device after a certain time that the transmission quality of a RB is bad, and supposing that the state configured by the RB formerly is the deactivated state, the network device may indicate the terminal device that the RB may be switched to be in the activated state; that is, the network device may instruct the RB to enable the duplicated-data transmission function, i.e., the RB may be used by the terminal device to transmit the duplicated data to guarantee the reliability of the data transmission. or, it is found by the network device after a certain time that the transmission quality of a RB is very good, and supposing that the PDCP configured formerly and corresponding to the RB is associated with two RLC entities, the network device may indicate the terminal device that the RB may be switched to be in the deactivated state; that is, the network device may instruct the RB to stop using the duplicated-data transmission function, and the terminal device may transmit the non-duplicated data by using either RLC entity in the two RLC entities.

It is to be understood that the above are described with the network device dynamically adjusting one RB as an example. The network device may also dynamically adjust states of duplicated-data transmission of PDCP entities corresponding to multiple RBs.

Specifically, the network device may directly instruct a RBs whether to enable the duplicated-data transmission function. For example, the network device may indicate multiple RBs through a bitmap. The network device may agree with the terminal device in advance that a bit is used to instruct an RB whether to enable the duplicated-data transmission function or not. For example, "1" indicates that the RB enables the duplicated-data transmission function, that is, the RB may be used by the terminal device to transmit duplicated data; and "0" indicates that the RB stops the duplicated-data transmission function, that is, the RB may be used by the terminal device to transmit non-duplicated data. The network device may send a piece of indication information to the terminal device, and a bit in the indication information is used independently to indicate whether the RB enables the duplicated-data transmission function or not. The network device may further reuse one bit in the indication information, that is, the bit is originally present in the indication information and is used for indicating other information but may simultaneously indicate the RB whether to enable the duplicated-data transmission function or not. Likewise, if the network device needs to indicate multiple RBs on whether to enable the duplicated-data transmission function or not, a bitmap may be used by the network device. The number of bits in the bitmap represents the number of RBs indicated by the network device to the terminal device, and each bit in the bitmap is used for instructing the represented RB whether to enable the duplicated-data transmission function or not. For example, at most eight DRBs are provided in wireless communication in general, and an 8-bit bitmap may be used. The eight DRBs may be mapped to the bitmap in advance, i.e., each bit in the bitmap represents one DRB of the eight DRBs, and such a mapping relationship is known to the network device and the terminal device in advance; in this way, after the terminal device receives the bitmap, the terminal device may check, according to such a mapping relationship, whether a DRB represented by each bit enables the duplicated-data transmission function or not.

The network device may further send an identifier of at least one RB to the terminal device, and the identifier of each RB in the at least one RB is used for instructing a corresponding RB to enable the duplicated-data transmission function, or the identifier of each RB is used for instructing a corresponding RB to stop using the duplicated-data transmission function.

Specifically, the network device and the terminal device may agree in advance that an identifier of an RB sent by the network device to the terminal device indicates that the duplicated-data transmission function may be used by the RB or an identifier of an RB sent by the network device to the terminal device indicates that the duplicated-data transmission function may not be used by the RB. After the network device determines which RBs may use the duplicated-data transmission function or which RBs may not use the duplicated-data transmission function, the network device may send identifiers of these RBs to the terminal device; and upon the reception of the identifiers of these RBs, the terminal device knows, according to the agreed rules, which RBs may use the duplicated-data transmission function and which RBs may not use the duplicated-data transmission function, and thus the terminal device may use corresponding RBs to send the duplicated data or the non-duplicated data.

It is to be understood that the above two indication manners are merely schematic description, to which the embodiments of the disclosure are not limited. Any manner for indicating whether an RB enables the duplicated-data transmission function or not is within the protection scope of the embodiments of the disclosure.

In this embodiment of the disclosure, the initial state is the activated state, and the operation that the terminal device sends data to the network device according to the switch information includes: the terminal device sends non-duplicated data to the network device via a first RLC entity, the first RLC entity being among multiple RLC entities corresponding to a PDCP entity that corresponds to the first RB.

Specifically, if the network device indicates the terminal device that the state of an RB is switched from the activated state to the deactivated state, i.e., it is indicated that the RB stops using the duplicated-data transmission function, and what transmitted by the terminal device by using the RB in the previous time is the duplicated data, the PDCP entity corresponding to the RB corresponds to two RLC entities intrinsically; and upon the reception of the indication of the network device, the terminal device may transmit the non-duplicated data by using one or more RLC entities among the multiple RLC entities corresponding to the PDCP entity that corresponds to the RB.

In this embodiment of the disclosure, the method further includes: the terminal device receives indication information, the indication information being used for indicating the first RLC entity.

The terminal device may independently determine, based on certain rules, which RLC entities among the multiple RLC entities are used to transmit non-duplicated data. The network device may also send an indication to the terminal device to indicate which RLC entities among the multiple RLC entities are used to transmit non-duplicated data. The network device may further send an indication to the terminal device to indicate which RLC entities among the multiple RLC entities cannot be used to transmit non-duplicated data, and the terminal device may use other RLC entities among the multiple RLC entities to transmit non-duplicated data. The terminal device may further release the RLC entities, which are not used for transmitting the non-duplicated data, among the multiple RLC entities.

In this embodiment of the disclosure, the initial state is the deactivated state, and the operation that the terminal device sends data to the network device according to the switch information includes: under a condition where a PDCP entity corresponding to the first RB corresponds to multiple RLC entities, the terminal device sends duplicated data to the network device via at least two RLC entities among the multiple RLC entities.

If the default state configured by the RB is to stop using the duplicated-data transmission function, it may be understood as that the RB transmits non-duplicated data previously all the time. In such a case, the network may configure for the RB that one PDCP corresponds to multiple RLC entities. That is, the network may make multiple RLC entities correspond to the PDCP entity corresponding to the RB. However, the network does not use the multiple RLC entities to transmit duplicated data at all previously but transmits non-duplicated data, e.g., the terminal device may transmit the non-duplicated data by using one RLC entity or more RLC entities among the multiple RLC entities corresponding to the PDCP that corresponds to the RB. As a result, when the network device instructs the RB to enable the duplicated-data transmission function, the terminal device may directly use a part or all of the RLC entities among the multiple RLC entities to transmit duplicated data.

In this embodiment of the disclosure, the initial state is the deactivated state, and the operation that the terminal device sends data to the network device according to the switch information includes: under a condition where a PDCP entity corresponding to the first RB corresponds to one RLC entity, the terminal device receives indication information sent by the network device, the indication information indicating other at least one RLC entity for transmitting duplicated data; and the terminal device sends the duplicated data to the network device via the RLC entity and the at least one RLC entity.

Specifically, the indication information may be an identifier of a logical channel corresponding to an RLC entity or some RLC entities. That is, the network device may agree in advance that as long as the terminal device receives an identifier of a logical channel, it may be indicated that the RLC entity of the logical channel may be associated with a PDCP of a RB. Alternatively, the network device may also agree in advance that as long as the terminal device receives an identifier of a logical channel, it may be indicated that an RLC entity corresponding to a logical channel except for this logical channel may be associated with a RLC entity.

Likewise, it may also be explicitly indicated that an RLC entity corresponding to a logical channel may be associated with a PDCP of a RB. Supposing that the terminal device may agree "1" to indicate a logical channel 0 and "0" to indicate a logical channel 1, the terminal device may know that an RLC entity corresponding to a logical channel may be associated with a PDCP entity of a RB when the terminal device receives indication information relevant to the RB.

It is to be understood that the above are described with "0" and "1" as an example, and the specific value of each bit may further be from a set of values and is not limited to "0" and "1", e.g., "0" and "2" may be respectively used to represent a logical channel 0 to a logical channel 2, which is not limited by this embodiment of the disclosure. Moreover, the meanings of the above values are also not limited.

In this embodiment of the disclosure, the operation that the terminal device receives switch information sent by the network device includes: the terminal device receives, via an MAC CE, the switch information sent by the network device.

It is to be understood that the switch information in this embodiment of the disclosure may be carried in MAC signaling, and the first indication information may also be carried in signaling at other layers, such as PHY signaling, and RLC signaling, which is not limited by this embodiment of the disclosure.

Figure 4:
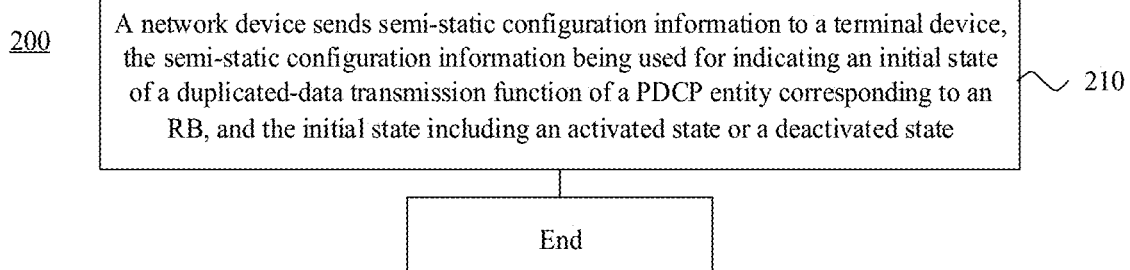
FIG. 4 illustrates another schematic block diagram of a method for transmitting data according to an embodiment of the disclosure.

FIG. 4 illustrates a schematic block diagram of a method 200 for transmitting data according to an embodiment of the disclosure. As shown in FIG. 4, the method 200 includes the following operations.

At S210, a network device sends semi-static configuration information to a terminal device, the semi-static configuration information being used for indicating an initial state of a duplicated-data transmission function of a PDCP entity corresponding to an RB, and the initial state including an activated state or a deactivated state.

The duplicated-data transmission function of the PDCP configured by the network helps to improve the reliability of data transmission.

In this embodiment of the disclosure, the method 200 further includes: the network device sends switch information to the terminal device, the switch information being used for indicating to switch a state of a duplicated-data transmission function of a PDCP entity corresponding to a first RB.

In this embodiment of the disclosure, the initial state is the activated state, and the method further includes: the network device receives non-duplicated data from the terminal device via a first RLC entity, the first RLC entity being among multiple RLC entities corresponding to a PDCP entity that corresponds to the first RB.

In this embodiment of the disclosure, the method further includes: the network device sends indication information to the terminal device, the indication information being used for indicating the first RLC entity.

In this embodiment of the disclosure, the initial state is the deactivated state, and the method further includes: under a condition where a PDCP entity corresponding to the first RB corresponds to multiple RLC entities, the network device receives duplicated data from the terminal device via at least two RLC entities among the multiple RLC entities.

In this embodiment of the disclosure, the initial state is the deactivated state, and the method further includes: under a condition where a PDCP entity corresponding to the first RB corresponds to one RLC entity, the network device may send indication information to the terminal device, the indication information indicating other at least one RLC entity; and the network device may receive duplicated data from the terminal device via the RLC entity and the at least one RLC entity.

In this embodiment of the disclosure, the operation that the network device sends switch information to the terminal device includes: the network device sends the switch information to the terminal device via an MAC CE.

In this embodiment of the disclosure, the RB includes a DRB and/or an SRB.

It is to be understood that interaction between the network device and the terminal device as well as related properties, functions and the like described from the network device side correspond to related properties, functions and the like of the terminal device. The relevant contents have been described in detail in the method 100, and will not be repeated for briefness.

It is to be further understood that, in various embodiments of the disclosure, a sequence number of each process does not mean an execution sequence and the execution sequence of each process may be determined by its function and an internal logic and may not form any limit to an implementation process of the embodiments of the disclosure.

The above describes the method for transmitting data according to the embodiment of the disclosure in detail. Hereinafter, an apparatus for transmitting data according to an embodiment of the disclosure will be described in combination with FIG. 5 to FIG. 8. The technical characteristics described in the method embodiment are applied to the following apparatus embodiments.

Figure 5:
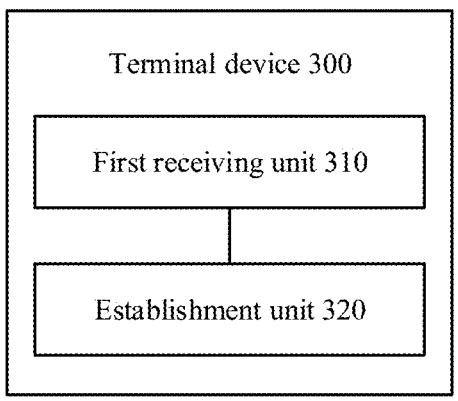
FIG. 5 illustrates a schematic block diagram of a terminal device for transmitting data according to an embodiment of the disclosure.

FIG. 5 illustrates a schematic block diagram of a terminal device 300 according to an embodiment of the disclosure. As shown in FIG. 5, the terminal device 300 includes a first receiving unit 310 and an establishment unit 320.

The first receiving unit 310 is configured to receive semi-static configuration information sent by a network device, the semi-static configuration information being used for indicating an initial state of a duplicated-data transmission function of a PDCP entity corresponding to an RB, and the initial state including an activated state or a deactivated state.

The establishment unit 320 is configured to establish a first RB according to the semi-static configuration information.

Therefore, the terminal device in this embodiment of the disclosure helps to improve the reliability of data transmission.

In this embodiment of the disclosure, the first RB includes one PDCP entity and multiple RLC entities corresponding to the PDCP entity.

In this embodiment of the disclosure, the initial state is the deactivated state, and the first RB includes one PDCP entity and multiple RLC entities corresponding to the PDCP entity.

In this embodiment of the disclosure, the terminal device 300 further includes: a second receiving unit, configured to receive switch information sent by the network device, the switch information being used for indicating to switch a state of duplicated-data transmission of a PDCP entity corresponding to the first RB; and a sending unit, configured to send data to the network device according to the switch information.

In this embodiment of the disclosure, the initial state is the activated state, and the sending unit is configured to: send non-duplicated data to the network device via a first RLC entity, the first RLC entity being among multiple RLC entities corresponding to a PDCP entity that corresponds to the first RB.

In this embodiment of the disclosure, the terminal device 300 further includes: a second receiving unit, configured to receive indication information, the indication information being used for indicating the first RLC entity.

In this embodiment of the disclosure, the initial state is the deactivated state, and the sending unit is configured to: send, under a condition where a PDCP entity corresponding to the first RB corresponds to multiple RLC entities, duplicated data to the network device via at least two RLC entities among the multiple RLC entities.

In this embodiment of the disclosure, the initial state is the deactivated state, and the sending unit is configured to: send, under a condition where a PDCP entity corresponding to the first RB corresponds to one RLC entity, receive indication information sent by the network device, the indication information indicating other at least one RLC entity for transmitting duplicated data; and send the duplicated data to the network device via the one RLC entity and the at least one RLC entity.

In this embodiment of the disclosure, the first receiving unit is configured to: receives, via an MAC CE, the switch information sent by the network device.

In this embodiment of the disclosure, the RB includes a DRB and/or an SRB.

It is to be understood that the terminal device 300 according to the embodiment of the disclosure may be the terminal device in the method embodiment of the disclosure and the above-mentioned and other operations and/or functions of each unit in the terminal device 300 are adopted to implement the corresponding flows executed by the terminal device in the method in FIG. 3 respectively and will not be elaborated herein for simplicity.

Figure 6:
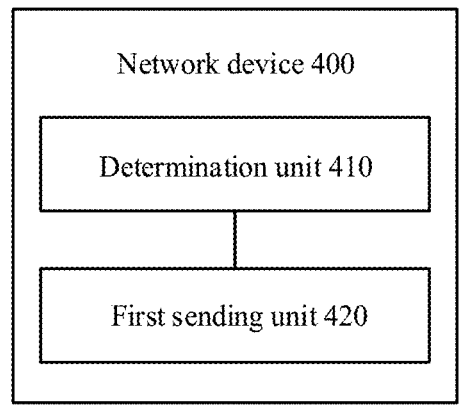
FIG. 6 illustrates a schematic block diagram of a network device for transmitting data according to an embodiment of the disclosure.

FIG. 6 illustrates a schematic block diagram of a network device 400 according to an embodiment of the disclosure. As shown in FIG. 6, the network device 400 includes: a determination unit 410 and a first sending unit 420.

The determination unit 410 is configured to determine semi-static configuration information, the semi-static configuration information being used for indicating an initial state of a duplicated-data transmission function of a PDCP entity corresponding to an RB, and the initial state including an activated state or a deactivated state.

The first sending unit 420 is configured to send the semi-static configuration information to a terminal device.

Therefore, the terminal device in this embodiment of the disclosure helps to improve the reliability of data transmission.

In this embodiment of the disclosure, the network device 400 further includes: a second sending unit, configured to send switch information to the terminal device, the switch information being used for indicating to switch a state of a duplicated-data transmission function of a PDCP entity corresponding to a first RB.

In this embodiment of the disclosure, the initial state is the activated state, and the network device 400 further includes: a receiving unit, configured to receive, via a first RLC entity among multiple RLC entities corresponding to a PDCP entity that corresponds to the first RB, non-duplicated data sent by the terminal device.

In this embodiment of the disclosure, the network device 400 further includes: a third sending unit, configured to send indication information to the terminal device, the indication information being used for indicating the first RLC entity.

In this embodiment of the disclosure, the initial state is the deactivated state, and the network device 400 further includes: a receiving unit, configured to receive, under a condition where a PDCP entity corresponding to the first RB corresponds to multiple RLC entities, duplicated data from the terminal device via at least two RLC entities among the multiple RLC entities.

In this embodiment of the disclosure, the initial state is the deactivated state, and the network device 400 further includes: a third sending unit, configured to send, under a condition where a PDCP entity corresponding to the first RB corresponds to one RLC entity, indication information to the terminal device, the indication information indicating other at least one RLC entity; and a receiving unit, configured to receive, via the one RLC entity and the at least one RLC entity, duplicated data sent by the terminal device.

In this embodiment of the disclosure, the first sending unit is configured to: send the switch information to the terminal device via an MAC CE.

In this embodiment of the disclosure, the RB includes a DRB and/or an SRB.

It is to be understood that the network device 400 according to the embodiment of the disclosure may be the network device in the method embodiment of the disclosure and the above-mentioned and other operations and/or functions of each unit in the network device 400 are adopted to implement the corresponding flows executed by the network device in the method in FIG. 4 respectively and will not be elaborated herein for simplicity.

Figure 7:
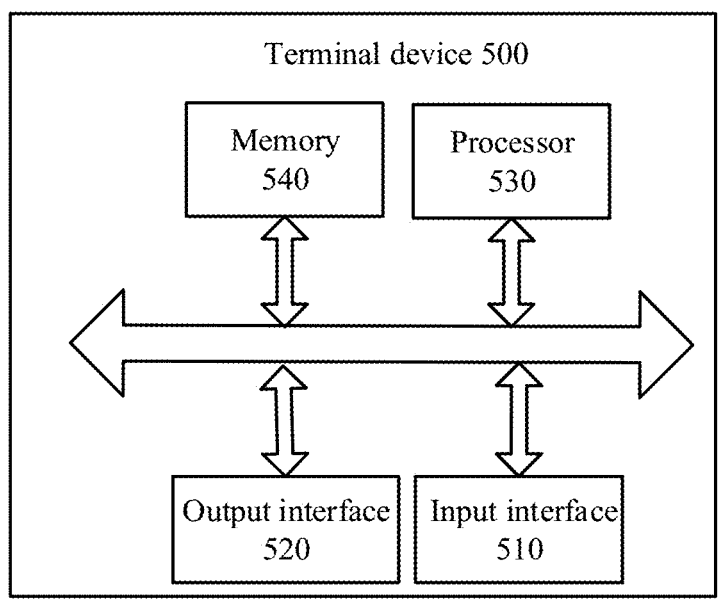
FIG. 7 illustrates another schematic block diagram of a terminal device for transmitting data according to an embodiment of the disclosure.

As shown in FIG. 7, an embodiment of the disclosure further provides a terminal device 500 for transmitting data. The terminal device 500 may be the terminal device 300 in FIG. 5, and may be configured to execute contents of the terminal device corresponding to the method 100 in FIG. 3. The terminal device 500 includes: an input interface 510, an output interface 520, a processor 530 and a memory 540. The input interface 510, the output interface 520, the processor 530 and the memory 540 may be connected through a bus system. The memory 540 is configured to store a program, an instruction or a code. The processor 530 is configured to execute the program, instruction or code in the memory 540 to control the input interface 510 to receive a signal, control the output interface 520 to send a signal and complete operations in the method embodiments.

Therefore, the terminal device in this embodiment of the disclosure helps to improve the reliability of data transmission.

It is to be understood that in this embodiment of the disclosure, the processor 530 may be a Central Processing Unit (CPU). The processor 530 may further be other universal processors, a Digital Signal Processor (DSP), an Application Specific Integrated Circuit (ASIC) and a Field Programmable Gate Array (FPGA) or other programmable logic devices, discrete gates or transistor logic devices, and discrete hardware component, etc. The universal processor may be a microprocessor or the processor may also be any conventional processor, etc.

The memory 540 may include a Read Only Memory (ROM) and a Random Access Memory (RAM) and provides instructions and data for the processor 530. A part of the memory 540 may further include a nonvolatile RAM. For example, the memory 540 may further store information on a type of a storage device.

During an implementation process, the operations of the methods may be accomplished by an integrated logic circuit of hardware in the processor 530 or an instruction in a software form. Operations of the methods disclosed in combination the embodiments of the disclosure may be directly executed and accomplished by a hardware processor, or may be executed and accomplished using a combination of hardware and software modules in the processor. The software module may be located in a mature storage medium in the art, such as a RAM, a flash memory, an ROM, a Programmable ROM (PROM), an Electrically EPROM (EEPROM) or a register. The storage medium may be located in the memory 540. The processor 530 may read information from the memory 540 and complete the operations of the foregoing methods in combination with the hardware of the processor. In order to avoid repetition, the above will not be described herein in detail.

In a specific implementation mode, the first receiving unit and the second receiving unit in the terminal device 300 may be implemented by the input interface 510 in FIG. 7, and the sending unit in the terminal device 300 may be implemented by the output interface 520 in FIG. 7. The establishment unit in the terminal device 300 may be implemented by the processor 530 in FIG. 7.

Figure 8:
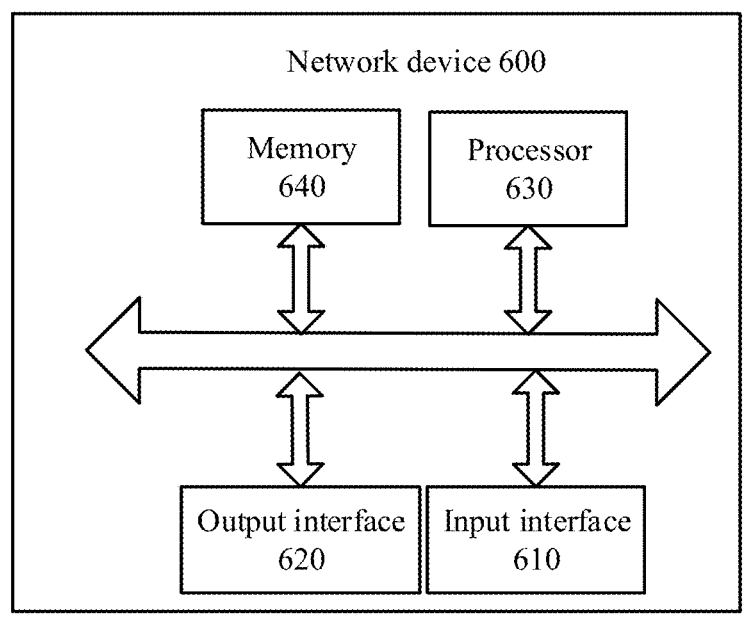
FIG. 8 illustrates another schematic block diagram of a network device for transmitting data according to an embodiment of the disclosure.

As shown in FIG. 8, an embodiment of the disclosure further provides a network device 600 for transmitting data. The network device 600 may be the network device 400 in FIG. 6, and may be configured to execute contents of the network device corresponding to the method 200 in FIG. 4. The network device 600 includes: an input interface 610, an output interface 620, a processor 630 and a memory 640. The input interface 610, the output interface 620, the processor 630 and the memory 640 may be connected through a bus system. The memory 640 is configured to store a program, an instruction or a code. The processor 630 is configured to execute the program, instruction or code in the memory 640 to control the input interface 610 to receive a signal, control the output interface 620 to send a signal and complete operations in the method embodiments.

Therefore, the network device in this embodiment of the disclosure helps to improve the reliability of data transmission.

It is to be understood that in this embodiment of the disclosure, the processor 630 may be a Central Processing Unit (CPU). The processor 630 may further be other universal processors, a Digital Signal Processor (DSP), an Application Specific Integrated Circuit (ASIC) and a Field Programmable Gate Array (FPGA) or other programmable logic devices, discrete gates or transistor logic devices, and discrete hardware component, etc. The universal processor may be a microprocessor or the processor may also be any conventional processor, etc.

The memory 640 may include a Read Only Memory (ROM) and a Random Access Memory (RAM) and provide instructions and data for the processor 630. A part of the memory 640 may further include a nonvolatile RAM. For example, the memory 640 may further store information on a type of a storage device.

During an implementation process, the operations of the methods may be accomplished by an integrated logic circuit of hardware in the processor 630 or an instruction in a software form. Operations of the methods disclosed in combination the embodiments of the disclosure may be directly executed and accomplished by a hardware processor or may be executed and accomplished using a combination of hardware and software modules in the processor. The software module may be located in a mature storage medium in the art, such as a RAM, a flash memory, an ROM, a Programmable ROM (PROM), an Electrically EPROM (EE-PROM) or a register. The storage medium may be located in the memory 640. The processor 630 may read information from the memory 640 and complete the operations of the foregoing methods in combination with the hardware of the processor. In order to avoid repetition, the above will not be described herein in detail.

In a specific implementation mode, the first sending unit, the second sending unit and the third sending unit in the network device 400 may be implemented by the output interface 620 in FIG. 8, and the receiving unit in the network device 400 may be implemented by the input interface 610 in FIG. 8. The determination unit in the network device 400 may be implemented by the processor 630 in FIG. 8.

A person of ordinary skill in the art may be aware that, in combination with the examples described in the embodiments disclosed in this specification, units and algorithm steps may be implemented by electronic hardware, computer software or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it is to be understood that the disclosed system, apparatuses, and methods may be implemented in other manners. For example, the described apparatus embodiments are merely exemplary. For example, the unit division is merely logical function division and may be other division in actual implementation. For example, a plurality of units or components may be combined or integrated into other system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the disclosure essentially, or the part contributing to the prior art, or some of the technical solutions may be implemented in a form of a software product. The software product is stored in a storage medium and includes several instructions for instructing a computer device (which may be a personal computer, a server, or a network device) to perform all or some of the steps of the methods described in the embodiments of the disclosure. The foregoing storage medium includes any medium that can store program code, such as a U disk, a removable hard disk, an ROM, an RAM, a magnetic disk, or an optical disc.

The foregoing descriptions are merely specific implementation manners of the disclosure but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

The invention claimed is:

1. A method for transmitting data, comprising:
receiving, by a terminal device, radio resource control (RRC) signaling from a network device, the RRC signaling being used for indicating an initial state of a duplicated-data transmission function of at least one Packet Data Convergence Protocol (PDCP) entity corresponding to at least one Radio Bearer (RB), and the initial state comprising an activated state or a deactivated state;
establishing, by the terminal device, a first RB according to the RRC signaling;
receiving, by the terminal device, switch information from the network device, the switch information being used for indicating to switch a state of duplicated-data transmission of a PDCP entity corresponding to the first RB; and
sending, by the terminal device, data to the network device according to the switch information,
wherein the switch information is 1 bit, and the 1 bit is configured to indicate whether to enable the duplicated-data transmission function to the PDCP entity corresponding to the first RB; or
the switch information is an identifier of the first RB, where the identifier of the first RB is agreed between the network device and the terminal device to instruct the PDCP entity corresponding to the first RB to enable the duplicated-data transmission function or to stop using the duplicated-data transmission function.

2. The method of claim 1, wherein
the first RB comprises a PDCP entity and multiple Radio Link Control (RLC) entities corresponding to the PDCP entity.

3. The method of claim 1, wherein when the initial state is the activated state, sending, by the terminal device, the data to the network device according to the switch information comprises:
sending, by the terminal device, non-duplicated data to the network device via a first Radio Link Control (RLC) entity, wherein the first RLC entity is among at least two RLC entities corresponding to the PDCP entity corresponding to the first RB.

4. The method of claim 3, further comprising:
receiving, by the terminal device, indication information, the indication information being used for indicating the first RLC entity.

5. The method of claim 1, wherein when the initial state is the deactivated state, sending, by the terminal device, the data to the network device according to the switch information comprises:
sending, by the terminal device, under a condition where the PDCP entity corresponding to the first RB corresponds to multiple RLC entities, duplicated data to the network device via at least two RLC entities among the multiple RLC entities; or,
receiving, by the terminal device, under a condition where the PDCP entity corresponding to the first RB corresponds to one RLC entity, indication information from the network device, the indication information being used for indicating other at least one RLC entity for transmitting duplicated data; and sending, by the terminal device, the duplicated data to the network device via the one RLC entity and the other at least one RLC entity.

6. The method of claim 1, wherein receiving, by the terminal device, the switch information sent by the network device comprises:
receiving, by the terminal device, the switch information from the network device via a Media Access Control (MAC) Control Element (CE).

7. The method of claim 1, wherein the RB comprises at least one of a Signaling Radio Bearer (SRB) and a Data Radio Bearer (DRB).

8. A method for transmitting data, comprising:
sending, by a network device, radio resource control (RRC) signaling to a terminal device, the RRC signaling being used for indicating an initial state of a duplicated-data transmission function of at least one Packet Data Convergence Protocol (PDCP) entity corresponding to at least one Radio Bearer (RB), and the initial state including an activated state or a deactivated state;
sending, by the network device, switch information to the terminal device, the switch information being used for indicating to switch a state of duplicated-data transmission of a PDCP entity corresponding to a first RB; and
receiving, by the network device, data sent by the terminal device according to the switch information,
wherein the switch information is 1 bit, and the 1 bit is configured to indicate whether to enable the duplicated-data transmission function to the PDCP entity corresponding to the first RB; or
the switch information is an identifier of the first RB, where the identifier of the first RB is agreed between the network device and the terminal device to instruct the PDCP entity corresponding to the first RB to enable the duplicated-data transmission function or to stop using the duplicated-data transmission function.

9. The method of claim 8, wherein when the initial state is the activated state, the method further comprises:
receiving, by the network device, non-duplicated data from the terminal device via a first Radio Link Control (RLC) entity, wherein the first RLC entity is among at least two RLC entities corresponding to the PDCP entity corresponding to the first RB.

10. The method of claim 9, further comprising:
sending, by the network device, indication information to the terminal device, the indication information being used for indicating the first RLC entity.

11. A terminal device, comprising:
an input interface, configured to receive radio resource control (RRC) signaling sent by a network device, the RRC signaling being used for indicating an initial state of a duplicated-data transmission function of at least one Packet Data Convergence Protocol (PDCP) entity corresponding to at least one Radio Bearer (RB), and the initial state comprising an activated state or a deactivated state; and
a processor, configured to establish a first RB according to the RRC signaling;
wherein the input interface is further configured to receive switch information from the network device, the switch information being used for indicating to switch a state of duplicated-data transmission of a PDCP entity corresponding to the first RB; and
the terminal device further comprises an output interface, configured to send data to the network device according to the switch information,
wherein the switch information is 1 bit, and the 1 bit is configured to indicate whether to enable the duplicated-data transmission function to the PDCP entity corresponding to the first RB; or the switch information is an identifier of the first RB, where the identifier of the first RB is agreed between the network device and the terminal device to instruct the PDCP entity corresponding to the first RB to enable the duplicated-data transmission function or to stop using the duplicated-data transmission function.

12. The terminal device of claim 11, wherein the first RB comprises a PDCP entity and multiple Radio Link Control (RLC) entities corresponding to the PDCP entity.

13. The terminal device of claim 11, wherein when the initial state is the activated state, the output interface is further configured to send non-duplicated data to the network device via a first Radio Link Control (RLC), wherein the first RLC entity is among at least two RLC entities corresponding to the PDCP entity corresponding to the first RB.

14. The terminal device of claim 13, wherein the input interface is further configured to receive indication information, the indication information being used for indicating the first RLC entity.

15. The terminal device of claim 11, when the initial state is the deactivated state, the processor is further configured to:

control the output interface to send, under a condition where the PDCP entity corresponding to the first RB corresponds to multiple RLC entities, duplicated data to the network device via at least two RLC entities among the multiple RLC entities; or, control the input interface to receive, under a condition where the PDCP entity corresponding to the first RB corresponds to one RLC entity, indication information from the network device, the indication information being used for indicating other at least one RLC entity for transmitting duplicated data; and control the output interface to send the duplicated data to the network device via the one RLC entity and the other at least one RLC entity.

16. The terminal device of claim 11, wherein the input interface is configured to:

receive, via a Media Access Control (MAC) Control Element (CE), the switch information sent by the network device.

17. The terminal device of claim 11, wherein the RB comprises at least one of a Signaling Radio Bearer (SRB) and a Data Radio Bearer (DRB).

18. A network device, comprising:

a processor, configured to determine radio resource control (RRC) signaling, the RRC signaling being used for indicating an initial state of a duplicated-data transmission function of at least one Packet Data Convergence Protocol (PDCP) entity corresponding to at least one Radio Bearer (RB), and the initial state including an activated state or a deactivated state;

an output interface, configured to send the RRC signaling to a terminal device, and send switch information to the terminal device, the switch information being used for indicating to switch a state of duplicated-data transmission of a PDCP entity corresponding to a first RB; and an input interface, configured to receive data sent by the terminal device according to the switch information, wherein the switch information is 1 bit, and the 1 bit is configured to indicate whether to enable the duplicated-data transmission function to the PDCP entity corresponding to the first RB; or the switch information is an identifier of the first RB, where the identifier of the first RB is agreed between the network device and the terminal device to instruct the PDCP entity corresponding to the first RB to enable the duplicated-data transmission function or to stop using the duplicated-data transmission function.

19. The network device of claim 18, wherein when the initial state is the activated state, the output interface is further configured to send indication information to the terminal device, the indication information being used for indicating a first Radio Link Control (RLC) entity; and the processor is further configured to control an input interface to receive non-duplicated data from the terminal device via the first RLC entity, wherein the first RLC entity is among at least two RLC entities corresponding to the PDCP entity corresponding to the first RB.

20. The network device of claim 18, wherein when the initial state is the deactivated state, the processor is further configured to:

control an input interface to receive, under a condition where the PDCP entity corresponding to the first RB corresponds to multiple RLC entities, duplicated data from the terminal device via at least two RLC entities among the multiple RLC entities; or, control the output interface to send indication information to the terminal device under a condition where the PDCP entity corresponding to the first RB corresponds to one RLC entity only, the indication information being used for indicating other at least one RLC entity; and control an input interface to receive duplicated data from the terminal device, via the one RLC entity and the other at least one RLC entity.

21. The network device of claim 18, wherein the output interface is configured to:

send the switch information to the terminal device via a Media Access Control (MAC) Control Element (CE).

* * * * *